United States Patent
Oesterwind et al.

(10) Patent No.: US 11,173,836 B2
(45) Date of Patent: Nov. 16, 2021

(54) METHOD FOR DETECTING A DRIVER'S HANDS ON A STEERING WHEEL OF A VEHICLE

(71) Applicant: ZF Automotive Germany GmbH, Alfdorf (DE)

(72) Inventors: Tobias Oesterwind, Düsseldorf (DE); Dirk Zimmermann, Aachen (DE); Keiwan Kashi, Düsseldorf (DE)

(73) Assignee: ZF Automotive Germany GmbH, Alfdorf (DE)

( * ) Notice: Subject to any disclaimer, the term of this patent is extended or adjusted under 35 U.S.C. 154(b) by 40 days.

(21) Appl. No.: 16/636,323

(22) PCT Filed: Jul. 26, 2018

(86) PCT No.: PCT/EP2018/070303
§ 371 (c)(1),
(2) Date: Feb. 3, 2020

(87) PCT Pub. No.: WO2019/025281
PCT Pub. Date: Feb. 7, 2019

(65) Prior Publication Data
US 2021/0162919 A1    Jun. 3, 2021

(30) Foreign Application Priority Data

Aug. 3, 2017  (DE) .......................... 102017117610.1

(51) Int. Cl.
*B60Q 9/00*   (2006.01)
*G07C 5/08*   (2006.01)

(52) U.S. Cl.
CPC ............. *B60Q 9/00* (2013.01); *G07C 5/0816* (2013.01)

(58) Field of Classification Search
None
See application file for complete search history.

(56) References Cited

U.S. PATENT DOCUMENTS

2017/0029021 A1* 2/2017 Lee ...................... G05D 1/0088

FOREIGN PATENT DOCUMENTS

| DE | 102005056438 A1 | 6/2007 |
|----|-----------------|--------|
| DE | 102010010028 A1 | 4/2010 |
| DE | 102011002997 A1 | 7/2012 |
| DE | 102013209459 A1 | 11/2013 |
| DE | 102015205449 A1 | 3/2016 |
| DE | 102016114161 A1 | 2/2017 |
| EP | 2384946 A2      | 11/2011 |

* cited by examiner

*Primary Examiner* — Thomas S McCormack
(74) *Attorney, Agent, or Firm* — Robert James Harwood

(57) ABSTRACT

The invention relates to a method for detecting a driver's hands on a steering wheel of a vehicle. In one step, a steering system is excited to vibrate. The oscillations of the steering system are determined in a steering wheel remote area. The oscillations of a steering wheel near area of the steering system of the vehicle are determined. In a further step, the determined oscillations of the steering wheel near area are compared with stored characteristic oscillations of the steering wheel near area, which occur during the same excitation in a state in which the steering wheel is not touched.

17 Claims, 1 Drawing Sheet

METHOD FOR DETECTING A DRIVER'S HANDS ON A STEERING WHEEL OF A VEHICLE

CROSS-REFERENCE TO RELATED APPLICATIONS

This application is a national stage of International Application No. PCT/EP2018/070303, filed Jul. 26, 2018, the disclosure of which is incorporated herein by reference in its entirety, and which claimed priority to German Patent Application No. 102017117610.1, filed Aug. 3, 2017, the disclosure of which is incorporated herein by reference in its entirety.

TECHNICAL FIELD

The invention relates to a method for detecting a driver's hands on a steering wheel of a vehicle.

BACKGROUND

Electromechanically assisted steering systems (below referred to as "steering system" means an electromechanically assisted steering system) offer many advantages over conventional hydraulic power steering systems. In addition to a demand-driven activation of electric auxiliary drives, these steering systems can also be used for autonomous or semi-autonomous control of a vehicle. Different sensors or cameras are used to determine the direction of travel. Especially at higher speeds of the vehicle, such steering systems for autonomous steering of the vehicle should have an ever higher reliability.

An example of such a control system are the so-called lane keeping assistance systems, which help the driver to maintain a lane. However, the driver of a motor vehicle should be able to take full control of the motor vehicle again at any time. The presence of the driver's hands on a steering wheel has proved to be a reliable indicator of this.

In the case of fully autonomous motor vehicles, the control system should automatically control the motor vehicle as long as the driver does not want to take control of the motor vehicle himself. When the driver puts his hands on the steering wheel, this is a clear indicator that he wants to take control of the vehicle. On the contrary, if the driver takes his hands off the steering wheel, the automatic control system should take control of the motor vehicle.

For the technical implementation of such hand detection on the steering wheel, the steering wheels with capacitive or resistive sensors are previously known. For this purpose, the steering wheels must be structurally adapted and have additional electrical connections to a control unit. Furthermore, the hands of the driver must be located in certain areas of the steering wheel and thus can affect the habits and comfort of the driver.

SUMMARY

The object of the invention is to provide a method which may be performed in a technically simple manner and may detect whether a driver has placed his hands on a steering wheel of a vehicle.

According to the invention, a method is provided for detecting hands of a driver on a steering wheel of a vehicle, in which a steering system is excited to vibrate. The oscillations of the steering system are determined in an area remote from the steering wheel. In addition, the oscillations are determined in an area near the steering wheel of the steering system of the vehicle. The determined oscillations of the area near the steering wheel are compared with stored characteristic oscillations of the area near the steering wheel. In this case, characteristic oscillations of the area near the steering wheel are used, which occur during the same excitation in a state in which the steering wheel is not touched.

The steering system of the vehicle, which may consist, in particular, of a steering column, a steering wheel, and a steering gear, is considered as a damped harmonic oscillator. The damped harmonic oscillator in this case has a mass that is composed of the respective masses of the structural components. If the driver of the vehicle has his hands on the steering wheel or holds the steering wheel with his hands, the steering system has a different oscillation behavior with respect to the steering wheel without hands positioned thereon. Accordingly, based on a oscillation behavior or oscillational characteristics of the steering system, it may be checked whether the driver has positioned his hands on the steering wheel. For this purpose, the steering system may be excited to vibrate, and in the area near the steering wheel, the determined or measured oscillations are compared with characteristic oscillations of the area near the steering wheel in a state in which the steering wheel is not touched. In this case, the characteristic oscillations must have been excited in a similar manner. The method may detect, without additional technical components, whether the driver's hands are positioned on the steering wheel or not. For example, the sensors and steering assistance already used as part of the steering system may be used for this purpose. As soon as the characteristic oscillations and the determined oscillations in the area near the steering wheel deviate from one another, it may be assumed that the driver has positioned his hands on the steering wheel. To compensate for measurement uncertainties, the deviation may only be registered as such when a threshold value is exceeded. As a result, the method may verify continuously, at regular intervals or when required, whether the driver has placed his hands on the steering wheel. To increase the accuracy, the method may perform measurements or excite oscillations over a defined period of time and determine the resulting reactions.

According to an exemplary embodiment of the method, the steering system is excited in the area remote from the steering wheel. The area remote from the steering wheel of the steering system may, in this case, be regarded as a source of the excited harmonic oscillations of the steering system. Depending on the structural composition of the steering system, the harmonic oscillations may propagate to an area near the steering wheel and thus to the steering wheel itself. The area remote from the steering wheel of the steering system may be excited to vibrate, for example, while driving or by motor oscillations. However, the invention preferably provides that the excitation is artificially carried out by a device in a frequency spectrum that is outside the existing frequencies, that is, in a separate measurement frequency spectrum. As a result, the excitation frequency does not depend on current road conditions or the current motor speed, but it is predetermined and therefore, it is known.

According to a further embodiment of the method, the steering system is excited by at least one motor. In order to make the oscillation behavior of the steering system reproducible, the oscillations in the steering wheel remote area of the steering system may be artificially generated. The motor may be, for example, an electro-mechanical actuator or an unbalanced electric motor.

Depending on the mounting position of a steering assistance in the steering system, a servomotor already implemented in the steering system, i.e. an already available auxiliary motor for the steering assistance may be used to generate the oscillations in the steering wheel remote area. As a result, no additional components are needed.

Preferably, the servomotor may generate the oscillations in addition to applying oscillations to the steering assistance while driving. This may be done for example with a hydraulically or electrically driven servomotor. The oscillation excitations may be integrated in the form of a superposition of a steering assistance in the actuation of the servomotor.

According to a further embodiment of the method, the steering system is excited with at least one predetermined frequency, in a manner that the oscillations in the steering wheel near area of the steering system may be analyzed in a technically simple manner.

Advantageously, the steering system may be excited in an area remote from the steering wheel with a predetermined frequency spectrum. In this case, the frequency spectrum is a generally complex-valued function, which includes information on the amplitude as well as on the phase angle for each excitation frequency. The frequency spectrum may have a defined frequency pattern and an amplitude pattern. In this way, the method for detecting hands of the driver on the steering wheel of the vehicle may be implemented in manner that is tolerant to errors. Random oscillations or oscillation of the steering system may be ignored by the defined frequency spectrum, especially when the steering system is excited with a frequency spectrum that differs substantially from a frequency spectrum of random oscillations and oscillations. This allows the process to detect the driver's hands on the steering wheel more accurately.

According to a preferred embodiment of the method, the oscillations of the area near the steering wheel are compared with characteristic oscillations of the area near the steering wheel as a function of the vehicle speed. Due to the speed-dependent oscillation behavior of the vehicle and also of the steering system, the method may be optimized with regard to its accuracy if speed-dependent factors are taken into account in the analysis and comparison of the determined oscillations with the characteristic oscillations.

According to a further preferred embodiment of the method, the oscillations of the steering wheel near area of the steering system are compared with characteristic oscillations of the steering wheel near area as a function of the temperature of the steering system. The temperature affects the material properties of the respective components of the steering system. In particular, a speed of propagation of mechanical oscillations is directly influenced by temperature fluctuations. By including the temperature in the comparison of the determined oscillations with the characteristic oscillations, temperature-dependent deviations may be taken into account and, as a result, the method may be optimized.

According to a further embodiment, a frequency response of the steering system is compared with a characteristic frequency response of the steering system. The frequency response may be determined first by the Fourier Transform of the excited oscillations in the area remote from the steering wheel, and by the induced oscillations in the steering wheel near area. Then, the cross-correlation and the autocorrelation of the two variables are calculated and the cross-correlation divided by the autocorrelation. If the steering system may be modeled as a linear time invariant system (that is, if the non-linearity of the steering system is insignificant), then the frequency response may be defined as a ratio between the Fourier Transform of the oscillations in the steering wheel near area and the Fourier Transform of the generated oscillations in the steering wheel remote area. For this purpose, the generated oscillations of the area remote from the steering wheel of the steering system and the resulting oscillations of the area near the steering wheel of the steering system are determined, Fourier transformed and divided. Parallel to this, the Fourier Transform of the generated oscillations of the steering wheel remote area may be compared with the Fourier Transform of the theoretically expected characteristic oscillations of the steering wheel near area of the steering system. The characteristic oscillations of the area near the steering wheel, in this case, represent the oscillation behavior of the steering system, which is present when the driver has not positioned his hands on the steering wheel. By comparing the theoretical frequency response with the actually determined frequency response, it is possible to check precisely whether the driver's hands are on the steering wheel.

Alternatively, or in addition to the frequency response, an amplitude response and/or a phase response may be compared with the respective characteristic amplitude response and/or characteristic phase response of the steering system. In this case, the amplitude may be determined as a function of the frequency of the oscillation, or the phase may be determined as a function of the frequency of the oscillation, and both are compared with the corresponding theoretical and expected values. As a result, by means of appropriate sensors the oscillation behavior of the entire steering system may be observed and also used to perform the method. Furthermore, in doing this, an unbalance or malfunction of the steering system or of a steerable vehicle axle is detected.

According to a further embodiment of the method, a damping factor of the oscillations of the steering wheel near area of the steering system is compared with a damping factor of the characteristic oscillations. The entire steering system may be considered as a damped harmonic oscillator. The respective components, fastenings, and screw connections of the steering system damp or influence the oscillations of the entire steering system. In addition, a driver holding the steering wheel generates a further damping of the oscillations. This additional damping may be contrasted by comparison with an expected characteristic damping and may provide information about whether the driver has his hands on the steering wheel.

According to a further embodiment of the method, a resonant frequency of the oscillations of the area near the steering wheel is compared with a resonant frequency of the characteristic oscillations of the steering system. In particular, the steering system may be briefly excited to vibrate at a variable frequency in such a way that a maximum amplitude of the oscillations may be determined in the frequency range used. This maximum amplitude of the oscillations may be extracted with little computational effort and compared with a characteristic resonance frequency of the steering system. In case of deviations of the two frequencies, the driver may additionally change the oscillation behavior of the steering system.

According to a further preferred embodiment, a Fourier Transform of collected data of the steering wheel near area and/or the steering wheel remote area is performed to compare the determined oscillations of the steering wheel near area with stored characteristic oscillations of the steering wheel near area. In this case, in particular, the oscillations transmitted to the sensors of the steering system may be analyzed as part of a Fourier Transform. Such sensors may be, for example, torque sensors or rotation angle sensors. The oscillations generated cause corresponding deviations or swings in the sensors of frequency of the oscillations. By applying a Fourier Transform to the measurement data of the respective sensors, the frequencies of the oscillations may be filtered out and compared with the characteristic frequencies. Preferably, a Fast Fourier Transform may be used here. In this way, for example, the angles or angular variations determined by at least one rotation angle sensor, and/or the torque or torque variation determined by at least one torque sensor may be monitored at defined time intervals or in a continuous manner. The sensors may preferably record the respective oscillation behavior in the area of the steering system that is near to the steering wheel and/or in the area of the steering system that is remote from the steering wheel.

According to a further embodiment of the invention, one or more of the following characteristics of the detected oscillations are used in comparison with characteristic oscillations to determine whether the driver's hands are on the steering wheel: a lower resonant frequency; a flatter course of the frequency response, in particular a lower maximum; a dip in the frequency response below the resonant frequency; a dip in the phase response at a lower frequency; and a larger phase shift across the entire frequency spectrum.

BRIEF DESCRIPTION OF THE DRAWINGS

Further advantages and features of the invention will become apparent from the following description and the drawings to which reference is made. In which are shown.

DETAILED DESCRIPTION

Figure 1:
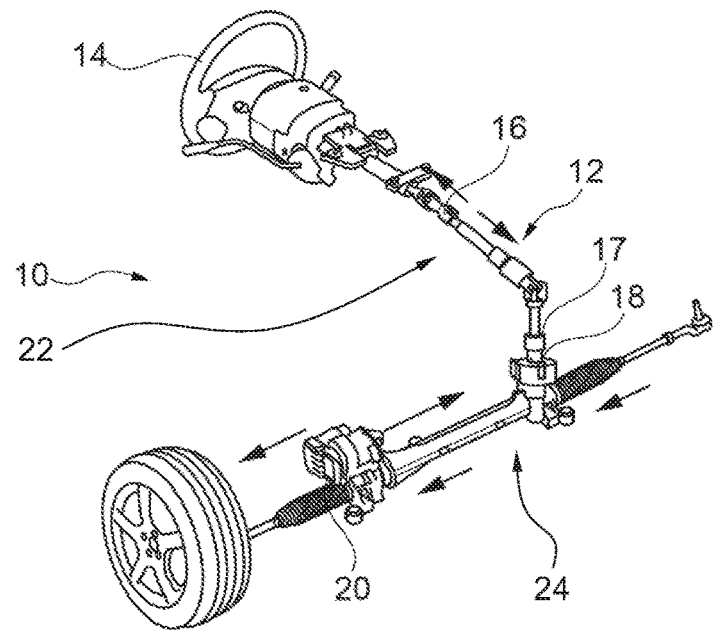
FIG. 1 illustrates a perspective view of a steering system of a motor vehicle.

A steering system 10 of a motor vehicle, as shown in FIG. 1, is designed as an electromechanically assisted steering system. The steering system 10 includes an upper part 12 with a steering wheel 14, a steering column 16 with a torsion bar 17, and a measuring device 18, as well as a lower part with an auxiliary motor 20. The area between the steering wheel 14 and the torsion bar 17 is hereinafter referred to as a steering wheel near area 22, while the area below the torsion bar 17 is referred to as a steering wheel remote area 24.

The driver acts upon the steering wheel 14 with a torque, so that the steering column 16 is rotated. The measuring device 18 determines a torque that acts upon the torsion bar 17, from a relative angle between an upper end (on the steering wheel side) and a lower end of the torsion bar 17. In addition, for example, an angular position sensor of the auxiliary motor 20 determines a rotation angle of the lower end of the torsion bar 17.

Based on the determined torque acting on the torsion bar 17 and on the rotation angle of the lower end of the torsion bar 17, the auxiliary motor 20 is actuated in a manner that it provides a suitable supporting torque for steering the motor vehicle.

The rotation angle of the lower end of the torsion bar 17 and the upper end of the torsion bar 17 may be determined in different ways, as a function of the measuring device 18. The different options are explained below.

If the measuring device 18 measures the rotation angle of the lower end of the torsion bar 17, then the rotation angle of the upper end of the torsion bar 17 may be determined from this rotation angle and from the detected torque acting on the torsion bar 17. Then, in particular it is not necessary to determine the rotation angle of the lower end of the torsion bar 17 from a signal of the angular position sensor of the auxiliary motor 20.

If the measuring device 18 measures the rotation angle of the upper end of the torsion bar 17 (and thus the rotation angle of the steering wheel 14), then this rotation angle is immediately available as a measured variable for further calculations.

Similarly, the rotation angles of the upper end and the lower end of the torsion bar 17 are immediately available for further calculations when the measuring device 18 measures these two rotation angles.

Figure 2:
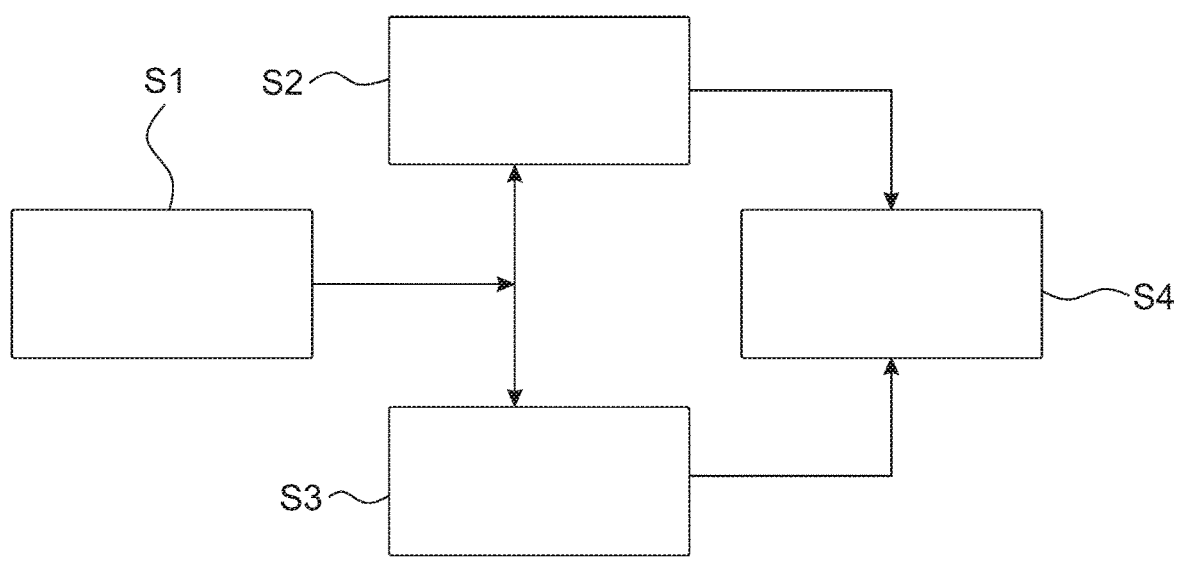
FIG. 2 illustrates a schematic representation of the steps of the method according to the invention.

With reference to FIG. 2, the method for detecting hands of the driver on the steering wheel 14 is described below. It is assumed that both the rotation angle of the upper end of the torsion bar 17 as well as the rotation angle of the lower end of the torsion bar 17 are known according to one of the variants described above.

First, the steering system 10 is artificially excited to vibrate (step S1) in the steering wheel remote area 24. The excitation may occur, for example, by means of the auxiliary motor 20 of the steering system 10. The auxiliary motor 20 especially excites the steering system 10 while driving, in addition to applying oscillations to the steering assistance. The excitation generates oscillations that take place in such a manner that the driving comfort and the control of the motor vehicle are not affected. The excitation occurs artificially by the auxiliary motor 20 in a frequency spectrum that is outside of the existing frequencies, that is, in a separate frequency spectrum that is outside of a frequency spectrum generated by road repercussions and/or motor oscillations. As a result, the excitation frequency does not depend on current road conditions or current motor speed, but it is predetermined and, therefore, it is known. Random oscillations or oscillations of the steering system 10 may be ignored by the defined frequency spectrum, especially when the steering system 10 is excited with a frequency spectrum that differs substantially from a frequency spectrum of random oscillations and oscillations.

The steering wheel remote area 24 is excited with a predetermined frequency spectrum, at least with a predetermined frequency. In this case, the frequency spectrum is generally a complex-valued function, which includes information on the amplitude as well as on the phase angle for each excitation frequency. Examples of such a frequency spectrum include a single excitation frequency with a certain amplitude and phase, a plurality of discrete excitation frequencies (each having a particular amplitude and phase), a continuous excitation frequency spectrum, a Heaviside step function excitation spectrum, and white noise. The steering wheel remote area 24 is excited in this way over a period of time, for example, about two seconds.

While the steering wheel remote area 24 is excited to vibrate, the rotation angle of the lower end of the torsion bar 17 is determined and stored according to one of the variants described above (step S2). More specifically, the rotation angle of the upper end of the torsion bar 17 is determined and stored as a function of time.

The oscillations in the steering wheel remote area 24 propagate through the torsion bar 17 in the steering wheel near area 22. In other words, the oscillations in the steering wheel remote area 24 induce oscillation excitations in the steering wheel near area 22.

The induced oscillations in the steering wheel near area 22 may now be determined (step S3). More specifically, the rotation angle of the upper end of the torsion bar 17 is determined and stored as a function of time.

The induced oscillations in the steering wheel near area 22 are now compared with characteristic oscillations of the steering wheel near area 22 (step S4). The characteristic oscillations may be the oscillations that occur during the same excitation in a state in which the steering wheel 14 is not touched. The characteristic oscillations may be stored in a table or in the form of an approximation formula in a control unit of the steering system 10. The data required for this purpose may be determined and stored, for example, in the context of a calibration of the steering system 10. Different variables may be used for comparison with the characteristic oscillations. Several exemplary options are explained below.

The frequency response of the steering system 10 is compared with a characteristic frequency response of the steering system 10. The frequency response may, in this case, be determined by forming the Fourier Transforms of the excited oscillations in the steering wheel remote area 24 (more specifically, the rotation angle $\Theta_{col}$ of the lower end of the torsion bar 17 is determined as a function of time), and then by the induced oscillations in the steering wheel near area 22 (more specifically, the rotation angle $\Theta_{ind}$ of the upper end of the torsion bar 17 is determined as a function of time). The Fourier Transforms are then indicated, $$f_{col}(\omega) = \frac{1}{N}\int_{-\infty}^{\infty}\Theta_{col}(t)e^{i\omega t}dt, \text{ and } f_{ind}(\omega) = \frac{1}{N}\int_{-\infty}^{\infty}\Theta_{ind}(t)e^{i\omega t}dt$$

where N is a convention-dependent normalization factor. The Fourier Transforms may be calculated by a Fast Fourier Transform (FFT).

Then, the cross-correlation and the autocorrelation of the two Fourier Transforms are calculated, and the cross-correlation may be divided by the autocorrelation. If the steering system 10 may be modeled as a linear time invariant system (that is, if the non-linearity of the steering system 10 is insignificant), then the frequency response may be defined as a ratio between the Fourier Transform of the oscillations in the steering wheel near area 22 and the Fourier Transform of the generated oscillations in the steering wheel remote area 24.

If the determined frequency response of the steering system 10 differs from a characteristic frequency response (frequency response of the characteristic oscillations), then this is a clear indication that the driver's hands are on the steering wheel 14. The driver's hands change the mass and the moment of inertia of the upper part 12 of the steering system 10 and then lead to an altered oscillation behavior. On the other hand, the driver (possibly unconsciously) engages the steering wheel 14 with a torque and in turn changes the oscillation behavior of the steering wheel near area 22 of the steering system 10.

Typical changes in the frequency response indicating that the driver's hands are on the steering wheel 14 affect the amplitude response and the phase response, which together form the frequency response. Concerning the amplitude response, these changes include: a lower resonance frequency (corresponds to the frequency at which the amplitude response is maximal), a flatter course of the amplitude response, in particular a lower maximum of the amplitude response (corresponds to a larger damping factor), and a dip in the amplitude response below the resonance frequency.

Concerning the phase response, for example, the following changes show that the driver's hands are on the steering wheel 14: a dip in the phase response at a lower frequency and/or a larger phase shift across the entire frequency spectrum.

To compensate for measurement uncertainties, the deviation may only be registered as such when a threshold value is exceeded. As a result, the method may verify continuously, at regular intervals or when required whether the driver has placed his hands on the steering wheel 14. In other words, the respective oscillation characteristics may differ from one another to a defined extent, so that measurement uncertainties, manufacturing tolerances, and unpredictable fluctuations are compensated. If the result of the deviation comparison exceeds a threshold value due to the different oscillation behavior of the steering system 10 in the steering wheel near area 22, this may be indicative of an additional damping of the steering wheel 14 generated by the driver's hands. To change the oscillation characteristics of the steering system 10, it is irrelevant whether the driver is holding the steering wheel 14 with only one hand or with both hands. Furthermore, the oscillation behavior of the steering wheel near area 22 of the steering system 10 changes independently of the position of the drivers hands on the steering wheel 14.

In order to further improve the accuracy of the method, the oscillations of the steering wheel near area 22 may also be determined additionally as a function of a temperature of the steering system 10 and/or a function of vehicle speed. The temperature of the steering system 10 may be equated, for example, to the ambient temperature. In this embodiment of the method, stored characteristic oscillations comprise a plurality of data records, as a function of the temperature of the steering system 10 and/or of the vehicle speed. Accordingly, the detected oscillations of the steering wheel near area 22 are compared with appropriate data record of the characteristic oscillations for the particular temperature and/or the vehicle speed.

The invention claimed is:

1. A method for detecting hands of a driver on a steering wheel of a vehicle, comprising the steps of:
    exciting a steering system to vibrate,
    determining oscillations of the steering system in a steering wheel remote area,
    determining oscillations of a steering wheel near area of the steering system of the vehicle, and
    comparing the determined oscillations of the steering wheel near area with stored characteristic oscillations of the steering wheel near area, which occur during the same excitation in a state in which the steering wheel is not touched, as a function of a temperature of the steering system.

2. The method according to claim 1, wherein the steering system in the steering wheel remote area is excited.

3. The method according to claim 1, wherein the steering system is excited by at least one motor.

4. The method according to claim 3, wherein the motor is a servomotor of a steering assistance.

5. The method according to claim 4, wherein the servomotor excites the steering system while driving, in addition to applying oscillations to the steering assistance.

6. The method according to claim 1, wherein the steering system is excited with at least one predetermined frequency.

7. The method according to claim 1, wherein the steering system is excited with a predetermined frequency spectrum.

8. The method according to claim 1, wherein the oscillations of the steering wheel near area are also compared with characteristic oscillations of the steering wheel near area as a function of the vehicle speed.

9. The method according to claim 1, wherein a frequency response of the steering system is compared with a characteristic frequency response of the steering system.

10. The method according to claim 9, wherein an amplitude response of the steering system is compared with a characteristic amplitude response of the steering system.

11. The method according to claim 9, in which a phase response of the steering system is compared with a characteristic phase response of the steering system.

12. The method according to claim 9, wherein a damping factor of the oscillations of the steering wheel near area of the steering system is compared with a damping factor of the characteristic oscillations.

13. The method according to claim 9, wherein a resonant frequency of the oscillations of the steering wheel near area of the steering system is compared with a resonant frequency of the characteristic oscillations.

14. The method according to claim 9, wherein in order to compare the detected oscillations of the steering wheel near area with stored characteristic oscillations of the steering wheel near area, a Fourier Transform of collected data of the steering wheel near area and/or of the steering wheel remote area is performed.

15. The method according to claim 14, wherein the collected data comprises a rotation angle of the steering wheel near area and/or the steering wheel remote area.

16. A method for detecting hands of a driver on a steering wheel of a vehicle, the method comprising:

exciting a steering system to vibrate;

determining oscillations of the steering system in a steering wheel remote area;

determining oscillations of a steering wheel near area of the steering system;

determining an amplitude response of the steering system as a function of the determined oscillations of the steering wheel near and remote areas; and comparing the amplitude response of the steering system with a stored characteristic amplitude response of the steering system, which occurs during the same excitation in a state in which the steering wheel is not touched, to detect if the driver's hands are on the steering wheel.

17. A method for detecting hands of a driver on a steering wheel of a vehicle, the method comprising:

exciting a steering system to vibrate;

determining oscillations of the steering system in a steering wheel remote area;

determining oscillations of a steering wheel near area of the steering system;

determining a phase response of the steering system as a function of the determined oscillations of the steering wheel near and remote areas; and comparing the phase response of the steering system with a stored characteristic phase response of the steering system, which occurs during the same excitation in a state in which the steering wheel is not touched, to detect if the driver's hands are on the steering wheel.

* * * * *